United States Patent [19]

Early

[11] Patent Number: 4,635,391

[45] Date of Patent: Jan. 13, 1987

[54] FISHING LINE GRIPPING AND RELEASE ASSEMBLY FOR ATTACHMENT TO A FLOATATION MEMBER

[76] Inventor: Susan E. Early, 2938 Fox Tail Ct., Woodbridge, Va. 22192

[21] Appl. No.: 744,328

[22] Filed: Jun. 13, 1985

[51] Int. Cl.$^4$ .............................................. A01K 91/06
[52] U.S. Cl. ..................................... 43/26.1; 43/43.12
[58] Field of Search ................. 43/26.1, 43.12; 269/8; 335/207; 242/150 M; 248/309.4

[56] References Cited

U.S. PATENT DOCUMENTS

| | | | |
|---|---|---|---|
| 2,557,399 | 6/1951 | Teetor | 248/309.4 |
| 2,693,047 | 11/1954 | Lumsden | 43/26.1 |
| 3,709,332 | 1/1973 | Rosen | 242/150 M |
| 3,832,658 | 8/1974 | Hayden | 335/207 |
| 3,963,229 | 6/1976 | Van Daynhoven | 269/8 |
| 4,068,202 | 1/1978 | Lyons | 335/207 |
| 4,161,077 | 7/1974 | Ciaccio | 43/26.1 |
| 4,222,489 | 9/1980 | Hutter | 248/309.4 |
| 4,313,578 | 2/1982 | Van Wilson | 242/150 M |

*Primary Examiner*—Nicholas P. Godici
*Assistant Examiner*—Christopher L. McKee
*Attorney, Agent, or Firm*—Shlesinger, Arkwright, Garvey & Fado

[57] ABSTRACT

A fishing line clamping and release assembly for attachment to a floatation member used to transport a fishing line to a remote fishing area of a body of water. The assembly includes superimposed members held together by magnetic force between which an intermediate portion of the fishing line is positioned and held fast. One of the members is slidably movable with respect to the other member to release the fishing line and permit it to drop into the water. The slidable member is actuated by a solenoid connected thereto which is remotely operated through a radio transmission signal.

9 Claims, 4 Drawing Figures

FISHING LINE GRIPPING AND RELEASE ASSEMBLY FOR ATTACHMENT TO A FLOATATION MEMBER

BACKGROUND OF THE INVENTION

Over the years, fishing has been traditionally carried out by using a rod and reel, by means of which the line is cast from the shore or other location proximate the water. The area of fishing in this manner is quite limited, and may be even further impaired by snagging the line in trees or objects in the water. Further limitations are imposed when fishing in remote areas that cannot easily be reached by boat or foot.

In more recent years, devices have been developed for fishing in such difficult areas by means of a remotely controlled floatation member which carries the fishing line, with hook attached, to the area where it is desired to fish, following which the hook is dropped into the water through remote control means. Illustrative of such devices are U.S. Pat. Nos. 3,739,516 issued June 19, 1973, 3,710,500 issued Jan. 16, 1973, 3,911,609 issued Oct. 14, 1975, 4,161,077 issued July 17, 1979 and 4,339,888 issued July 20, 1982.

These patents disclose various remote control means for moving floatation members carrying fishing lines to a selected fishing area. However, in many instances, the means for holding and releasing the fishing line on the floatation member is of expensive, complex construction. Additionally, some of the parts thereof extend a substantial distance above the floatation member, thereby making the assembly susceptible to snagging in three branches overlying the water, or other objects which are close to the surface of the water.

SUMMARY OF THE INVENTION

The present invention is a fishing line clamping and release assembly which is attached to a remote controlled floatation member for carrying the fishing line to a desired fishing area in a body of water, following which the fishing line is released and dropped into the water.

The assembly is of simple construction and includes magnetically attracted superimposed members between which a fishing line is positioned, and held firmly by virtue of the magnetic force between the two members. One of the members is fixed to the floatation member, and the other member is slidably movable with respect to the fixed member by means of a solenoid having a plunger which is connected to the movable member.

Operation of the solenoid is controlled through a servo and switch which are in circuit therewith, the servo being actuated from a remote position by a regular transmission signal.

The smooth exterior surface and low-lying magnetic mechanism for clamping the fishing line provides a low profile, thereby considerably minimizing any possibility that these parts will snag on the branches of overlying trees or vegetation growing in the water.

DESCRIPTION OF THE INVENTION

Figure 1:
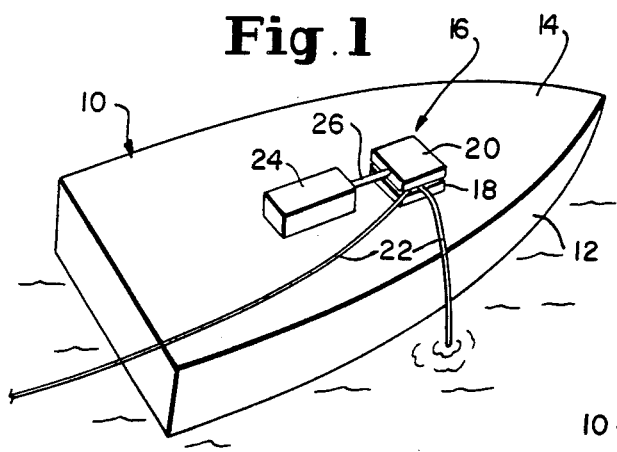
FIG. 1 is a pespective view of the assembly of the present invention, showing the fishing line in clamping position.

The present invention comprises a floatation member generally designated 10 which may be of any suitable shape or construction, such as the boat shape illustrated in the drawings including a hull 12 having a bow and stern, the upper part of the floatation member being closed by a top cover 14.

A fishing line clamping and release assembly 16 is mounted on top cover 14. Assembly 16 includes a pair of like, bar-shaped clamping members comprising a lower member 18 which is fixedly secured to top cover 14, and an upper member 20 which is superimposed on lower member 18. Upper and lower members 18 and 20 are of magnetically attracted materials, such as two magnets or a magnet and a steel bar so that, when the intermediate portion of a fishing line 22 is positioned between the upper and lower members, it is securely held by the magnetic force between lower member 18 and upper member 20, as shown to advantage in FIG. 1.

A solenoid 24 is fixedly mounted on top cover 14 adjacent lower member 18 and upper member 20, the solenoid including a plunger 26, the outer end of which is fixedly secured to an end of upper member 20.

Figure 2:
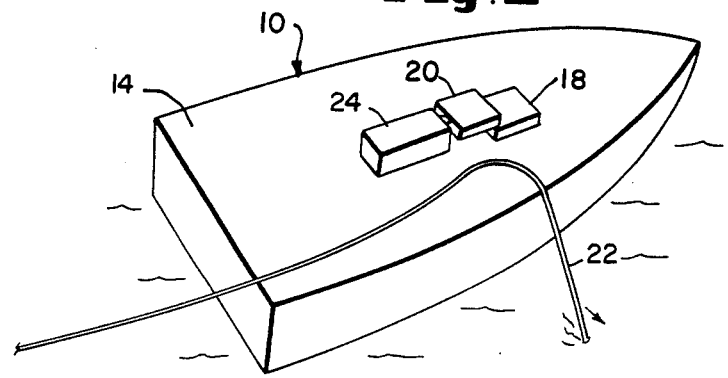
FIG. 2 is a view similar to FIG. 1, showing the fishing line just after release from the present assembly.
Figure 3:
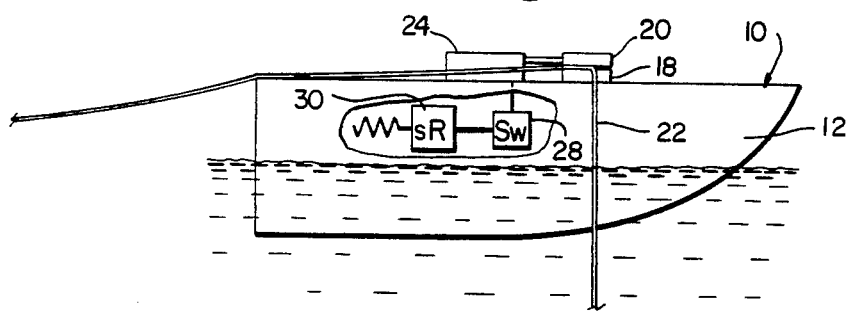
FIG. 3 is a side elevational view of the present invention in clamped position, a portion thereof being broken away to disclose details of construction.
Figure 4:
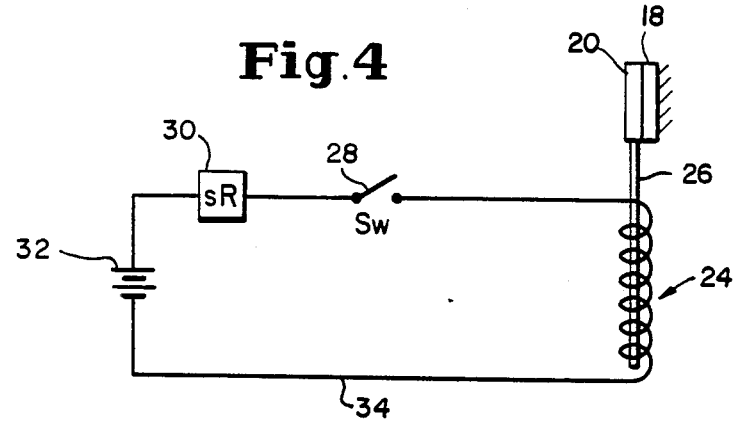
FIG. 4 is a schematic electrical diagram of the solenoid and controls therefor forming a part of the present invention.

Upper clamping member 20 is slidably movable over the top surface of lower clamping member 18 in response to deenergization of solenoid 24, as illustrated in FIG. 2. When upper member 20 is slid out of engagement with lower member 18, an intermediate part of fishing line 22 is bent to form a loop, and the loop portion thereof inserted on top of lower member 18. Energization of solenoid 24 causes upper member 20 to be slid in a direction to lie in superimposed contiguous relation with lower member 18 as shown in FIG. 1. The magnetic attraction between members 18 and 20 causes fishing line 22 to be clamped securely therebetween to prevent accidental disengagement from the assembly.

Operation of solenoid 24 is effected by means of a switch 28 which is in circuit with a servo 30 connected to a battery 32 which operates the servo through an electrical circuit 34. Operation of the servo is preferably carried out by a radio signal from a remote control radio on shore in a well-known manner. Switch 28, servo 30 and battery 32 are preferably mounted below top cover 14.

When the radio signal is transmitted to servo 30, the servo actuates switch 28 which deenergizes solenoid 24. Deenergization effects retraction of plunger 26, with resultant sliding movement of upper clamping member 20 to the position shown in FIG. 2 of the drawing.

In use of the present invention, floatation member 10 may be driven and controlled by any suitable mechanism, such as illustrated in prior art devices, with fishing line 22 held by clamping and release assembly 16. The fishing line is preferably held in such a manner that the tackle is raised off the bottom of the body of water, to prevent snagging thereof.

The radio signal actuates servo 30, thereby causing deenergization of solenoid 24, which releases fishing line 22, and permits the same to be dropped into the water, where the fishing line is then controlled by the fisherman on shore. The floatation member may then be directed back to shore by the radio. The assembly of the present invention, in combination with the floatation member, also lends itself to trolling without a boat, by radio control of the floatation member with the tackle at a suitable depth, while the fishing line is held by clamping members 18 and 20.

In the event that a fish bites while the clamping and release assembly is still in engagement with the fishing line, the line can be quickly freed from the magnet by a radio signal from shore and, in the event that there is a sufficiently strong tug by the fish on the line, the line is yanked free of the securing members by overcoming the clamping force of members 18 and 20 on the fishing line.

Floatation member 10 is preferably 8 to 12 inches in length for fresh water fishing and approximately 2 feet in length for salt water fishing, thereby rendering the floatation member to be used in small areas where there is a restricted passage through which it may traverse.

The present floatation member is useful for fresh water fishing at approximately a distance of 50 yards, and at the distance of 100 to 200 yards for salt water fishing.

Although any suitable means may be used for controlling operation of the floatation member, a three-channel radio control system, and accompanying servos, affords a simple means for operating the motor, for operating the rudder and for operating the switch that releases the fishing line.

The smooth exterior surface of the boat and the low profile of the clamping and release assembly minimizes the probability of snagging thereof on tree branches, weeds, etc. and therefore renders the same extremely practical for fishing in marshy, weed-filled areas. The floatation member also enables the fisherman to fish in areas which are not readily reached by boat or foot, and to fish in areas which are too far to cast with conventional line and reel.

While there has herein been disclosed the presently preferred form of this invention, it is to be understood that this has been done for purposes of illustration only, and that various changes may be made therein within the scope of the appended claims.

What is claimed is:

1. A fishing line gripping and release assembly in combination with a floatation member used to transport a fishing line to a remote fishing area of a body of water,
    (a) said assembly including opposed members mounted on said floatation member between which an intermediate portion of the fishing line is positioned, said opposed members being of bar shape and arranged for movement into and out of superimposed relation, one of said opposed members being fixed to said floatation member,
    (b) said opposed members being urged together by magnetic force to grippingly hold the fishing line therebetween while it is transported by the floatation member to the desired area for fishing, and
    (c) remotely controllable means for releasing the fishing line from the opposed members and allowing it to drop into the water, said remotely controllable means being connected to the other of said members for slidably moving the other of said members out of engagement with said one of said members.

2. The fishing line gripping and release assembly of claim 1, wherein
    (a) said means connected to the other of said members comprises a solenoid having a plunger, one end of which is connected to said other of said members, and
    (b) means for energizing said solenoid to effect movement of said plunger in a direction to cause sliding movement of said other of said members out of engagement with said one of said members.

3. The fishing line gripping and release assembly of claim 2, wherein
    (a) said means for energizing said solenoid includes motor means and a switch in circuit with said solenoid.

4. The fishing line gripping and release assembly of claim 3, with the addition of
    (a) means for controlling energization of said solenoid.

5. The fishing line gripping and release assembly of claim 4, wherein
    (a) said means for controlling energization of said solenoid comprises a radio transmitter at a remote location from the floatation and in radio communication with said motor means.

6. A fishing line gripping and release assembly in combination with to a floatation member used to transport a fishing line to a remote fishing area of a body of water
    (a) said assembly including a stationary lower member fixed to said floatation member;
    (b) a movable upper member in superimposed slidable engagement with said lower stationary member;
    (c) said lower and upper members being made of materials which are magnetically attracted materials;
    (d) an intermediate portion of the fishing line being inserted between, and grippingly engaged by, said lower and upper members;
    (e) a solenoid fixedly secured to said floatation member proximate said lower and upper members;
    (f) said solenoid including a movable plunger, one end of which is connected to said upper movable member, to effect sliding movement of the latter with respect to said lower member, whereby the fishing line is released from said assembly and permitted to drop into the water, and
    (g) remotely controllable means for actuating said solenoid.

7. The fishing line gripping and release assembly of claim 6, wherein
    (a) said upper and lower members are of complemental bar shape.

8. The fishing line gripping and release assembly of claim 6, wherein
    (a) said remotely controllable means for actuating said solenoid comprises a servo;
    (b) a switch in circuit with said servo to deenergize said solenoid and effect movement of the plunger in a direction to partially slide the top member off the lower member, and
    (c) control means for energizing said servo.

9. The fishing line gripping and release assembly of claim 8, wherein
    (a) said control means comprise a radio transmitter for sending a signal to the servo.

* * * * *